US012706321B2

(12) United States Patent
Kim et al.

(10) Patent No.: US 12,706,321 B2
(45) Date of Patent: Aug. 11, 2026

(54) MEANDERING CORRECTION DEVICE FOR ELECTRODE AND MEANDERING CORRECTION METHOD FOR ELECTRODE

(71) Applicant: LG Energy Solution, Ltd., Seoul (KR)

(72) Inventors: Dong Wook Kim, Daejeon (KR); Seung Hoon Choi, Daejeon (KR); Min Wook Kim, Daejeon (KR); Yong Gyun Lee, Daejeon (KR); Jong Sik Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 775 days.

(21) Appl. No.: 18/011,632

(22) PCT Filed: Feb. 15, 2022

(86) PCT No.: PCT/KR2022/002242
§ 371 (c)(1),
(2) Date: Dec. 20, 2022

(87) PCT Pub. No.: WO2022/182048
PCT Pub. Date: Sep. 1, 2022

(65) Prior Publication Data

US 2023/0335777 A1 Oct. 19, 2023

(30) Foreign Application Priority Data

Feb. 26, 2021 (KR) ........................ 10-2021-0026290

(51) Int. Cl.
*H01M 10/04* (2006.01)
*B65H 23/038* (2006.01)

(52) U.S. Cl.
CPC ...... *H01M 10/0409* (2013.01); *B65H 23/038* (2013.01); *H01M 10/0431* (2013.01); *B65H 2701/19* (2013.01)

(58) Field of Classification Search
CPC .......... H01M 10/0409; H01M 10/0431; B65H 23/038; B65H 2557/242; B65H 23/0204;
(Continued)

(56) References Cited

U.S. PATENT DOCUMENTS 4,959,040 A 9/1990 Gardner et al.
5,515,139 A 5/1996 Hou et al.
(Continued)

FOREIGN PATENT DOCUMENTS

CN 102259772 A 11/2011
CN 103579660 A 2/2014
(Continued)

OTHER PUBLICATIONS

International Search Report for Application No. PCT/KR2022/002242 mailed May 30, 2022, pp. 1-3.
(Continued)

*Primary Examiner* — Donghai D Nguyen
(74) *Attorney, Agent, or Firm* — Lerner David LLP

(57) ABSTRACT

The present technology provides a meandering correction device for electrode transfer that improves instability when an electrode is input by using determination edge position sensor (EPS) value data of the electrode hat changes over time when the edge position of the electrode is feedback-controlled by an edge position control (EPC) unit before being wound around a winding core to correct the input inclination of the electrode, and a method of correcting electrode meandering.

19 Claims, 10 Drawing Sheets

(58) Field of Classification Search
CPC .............. B65H 23/032; B65H 23/0322; B65H 2553/80; Y02P 70/50; Y10T 29/49108; Y10T 29/49126; G03G 15/755
See application file for complete search history.

(56) References Cited

U.S. PATENT DOCUMENTS

| | | | | |
|---|---|---|---|---|
| 5,964,339 | A * | 10/1999 | Matsuura | G03G 15/2017 198/810.03 |
| 6,534,952 | B1 | 3/2003 | Ishikawa et al. | |
| 6,600,507 | B2 * | 7/2003 | Sanchez | G03G 15/755 347/264 |
| 7,668,491 | B2 | 2/2010 | Furuya et al. | |
| 7,815,039 | B2 * | 10/2010 | Enomoto | B65H 5/224 198/806 |
| 8,459,640 | B2 * | 6/2013 | Ui | B65H 9/006 271/228 |
| 8,893,942 | B2 | 11/2014 | Oh et al. | |
| 9,274,459 | B1 | 3/2016 | Tokoro | |
| 2009/0278303 | A1 | 11/2009 | Fuwa | |
| 2012/0043408 | A1 | 2/2012 | Oh et al. | |
| 2014/0059875 | A1 | 3/2014 | Yuhara et al. | |
| 2015/0323309 | A1 | 11/2015 | Kabetani et al. | |
| 2019/0252729 | A1 | 8/2019 | Fujiwake et al. | |
| 2022/0131175 | A1 | 4/2022 | Lee et al. | |
| 2023/0318010 | A1 | 10/2023 | Kim et al. | |

FOREIGN PATENT DOCUMENTS

| | | | |
|---|---|---|---|
| CN | 203445187 | U | 2/2014 |
| CN | 106513443 | A | 3/2017 |
| CN | 110104474 | A | 8/2019 |
| JP | H09221252 | A | 8/1997 |
| JP | H1140144 | A | 2/1999 |
| JP | 2002-284415 | A | 10/2002 |
| JP | 2010143709 | A | 7/2010 |
| JP | 4595500 | B2 | 12/2010 |
| JP | 2012-240067 | A | 12/2012 |
| JP | 2014024662 | A | 2/2014 |
| JP | 5492351 | B1 | 5/2014 |
| JP | 5835146 | B2 | 12/2015 |
| JP | 2016051645 | A | 4/2016 |
| JP | 6635203 | B2 | 1/2020 |
| KR | 20020053841 | A | 7/2002 |
| KR | 20090117633 | A | 11/2009 |
| KR | 20110128716 | A | 11/2011 |
| KR | 101113424 | B1 | 3/2012 |
| KR | 101190211 | B1 | 10/2012 |
| KR | 20130137229 | A | 12/2013 |
| KR | 101956763 | B1 | 3/2019 |
| KR | 2019-0059676 | A | 5/2019 |
| KR | 102080346 | B1 | 2/2020 |
| KR | 2020-0109042 | A | 9/2020 |
| KR | 102192738 | B1 | 12/2020 |

OTHER PUBLICATIONS

Search Report dated Mar. 20, 2026 from the Office Action for Chinese Application No. 202280005043.1 issued Mar. 23, 2026, pp. 1-3.

Extended European Search Report including Written Opinion for Application No. 22760021.0 dated Jul. 16, 2024. 9 pgs.

Extended European Search Report including Written Opinion for Application No. 22760022.8 dated Jul. 16, 2024. 9 pgs.

Extended European Search Report including Written Opinion for Application No. 22759966.9 dated Jul. 16, 2024. 9 pgs.

* cited by examiner

【FIG. 1】
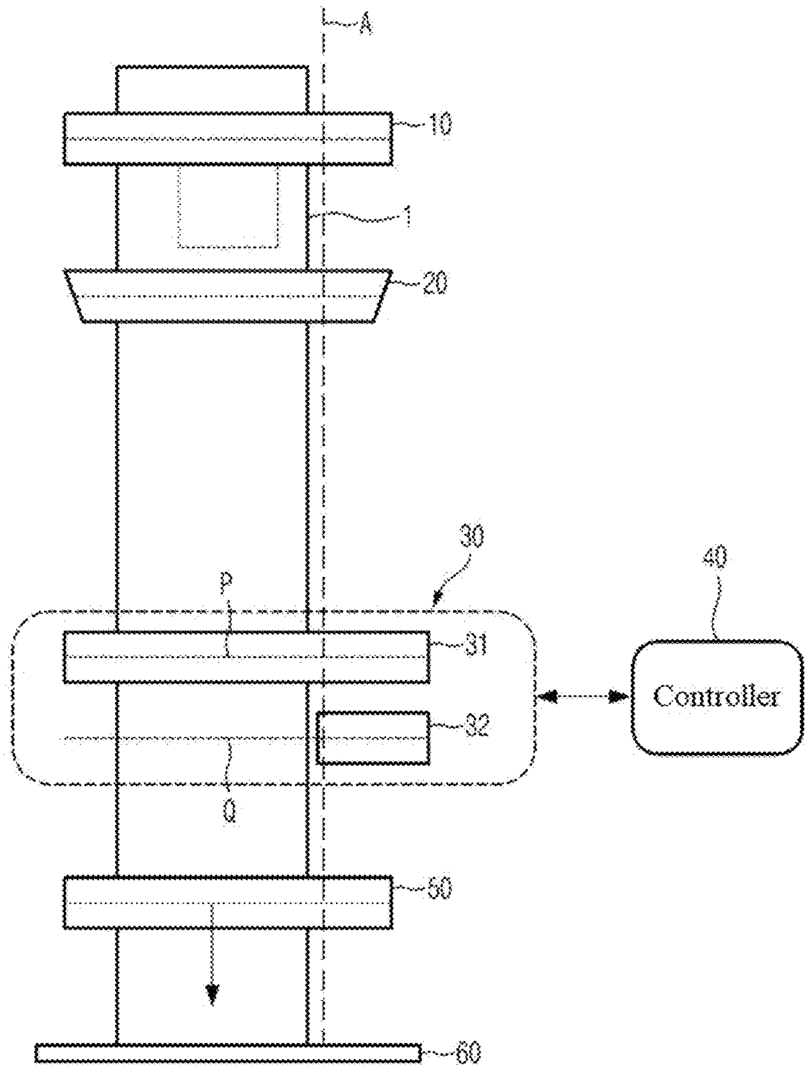
PRIOR ART

【FIG. 2】
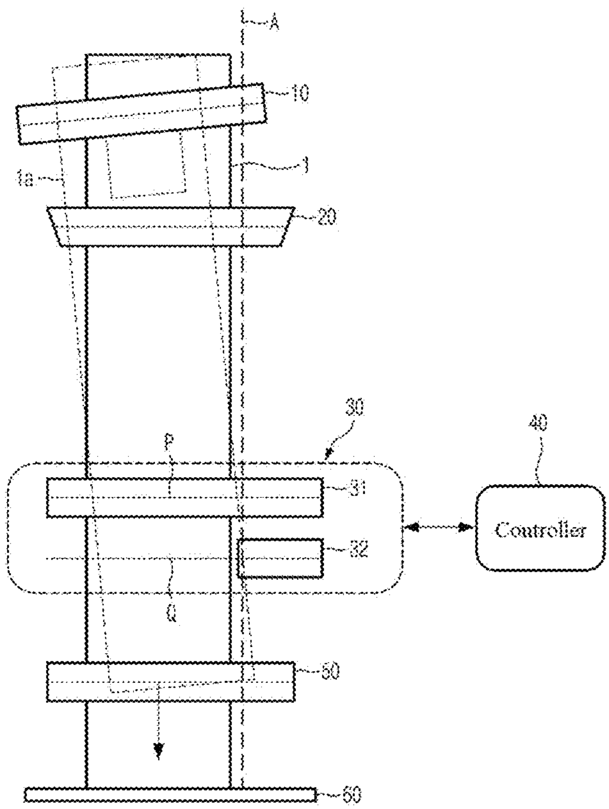
PRIOR ART
【FIG. 3】
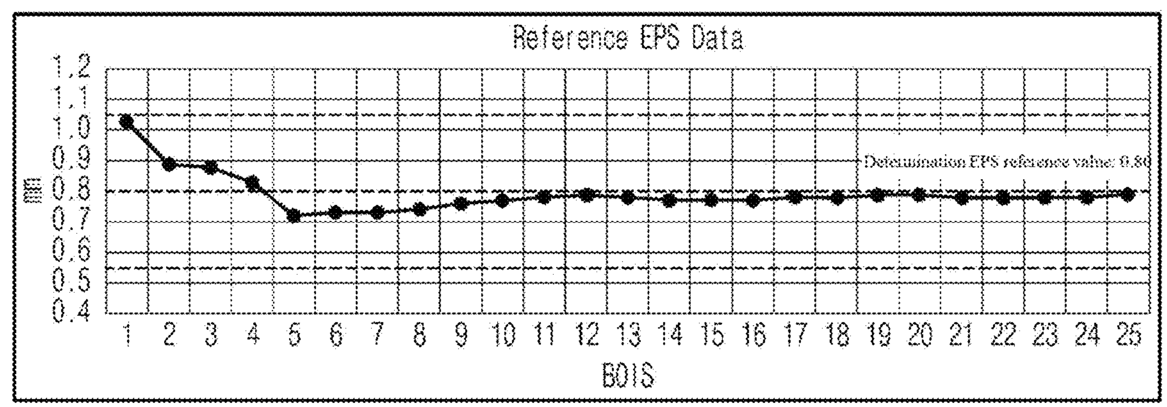

【FIG. 4】
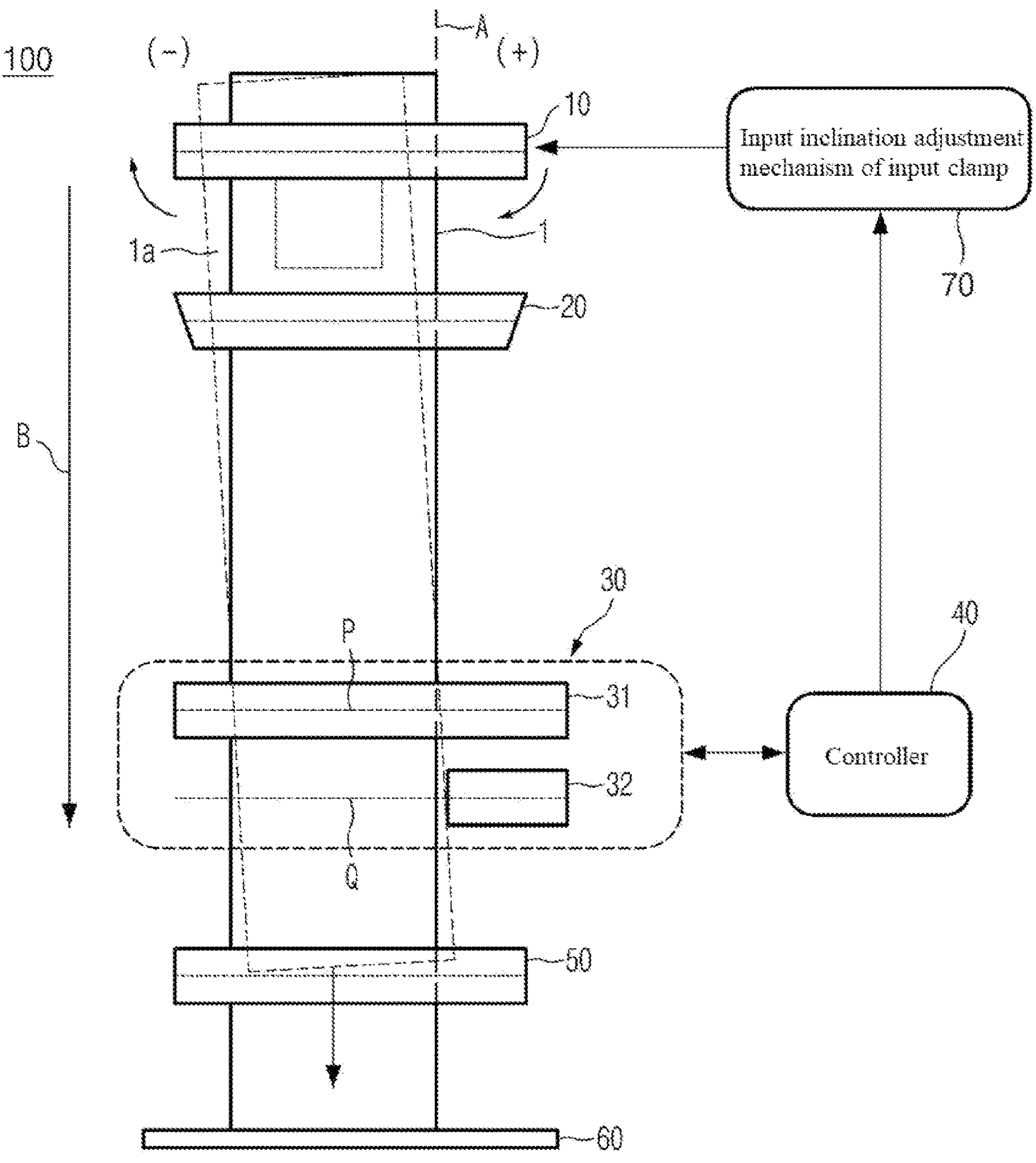

【FIG. 5】
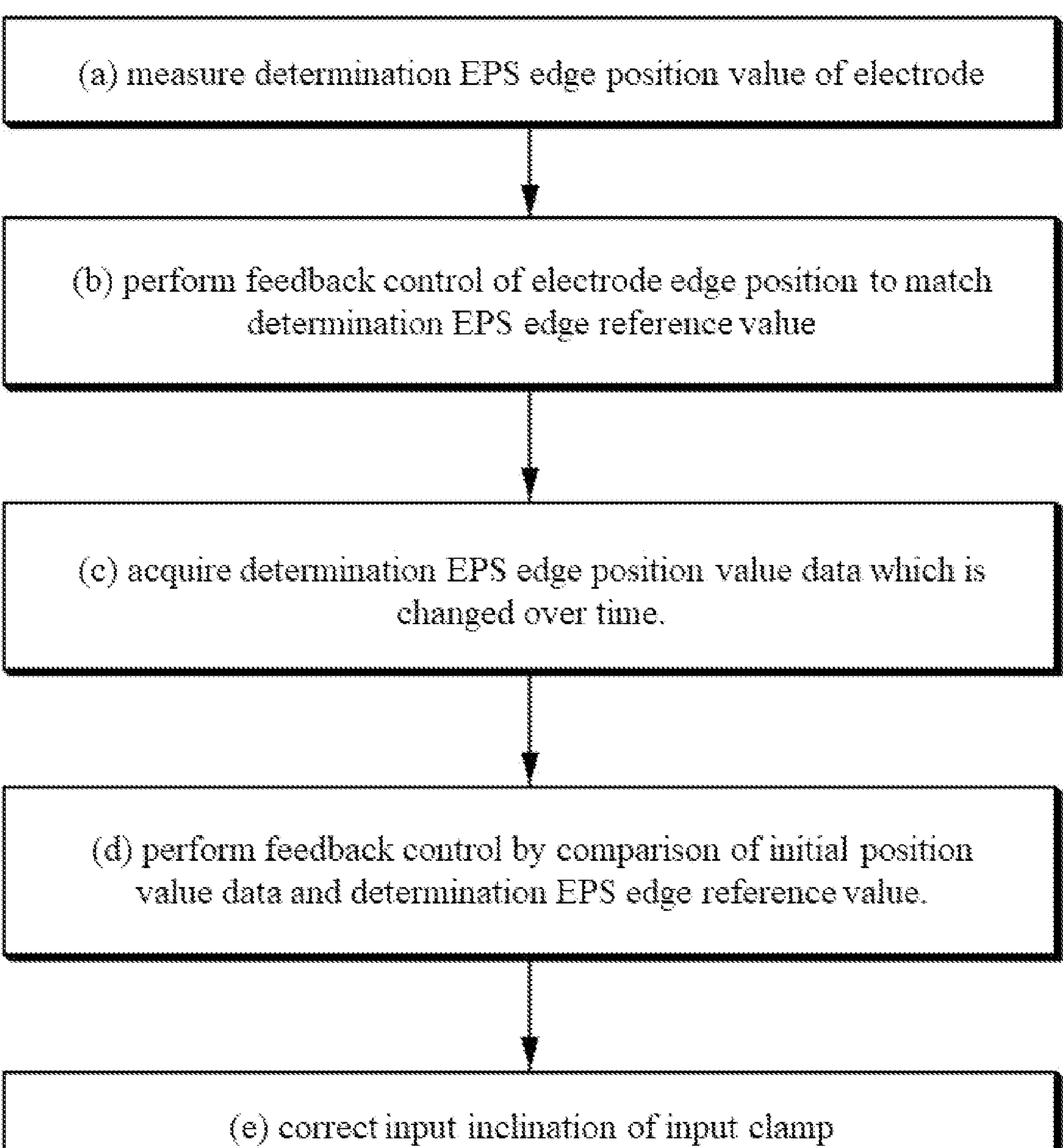

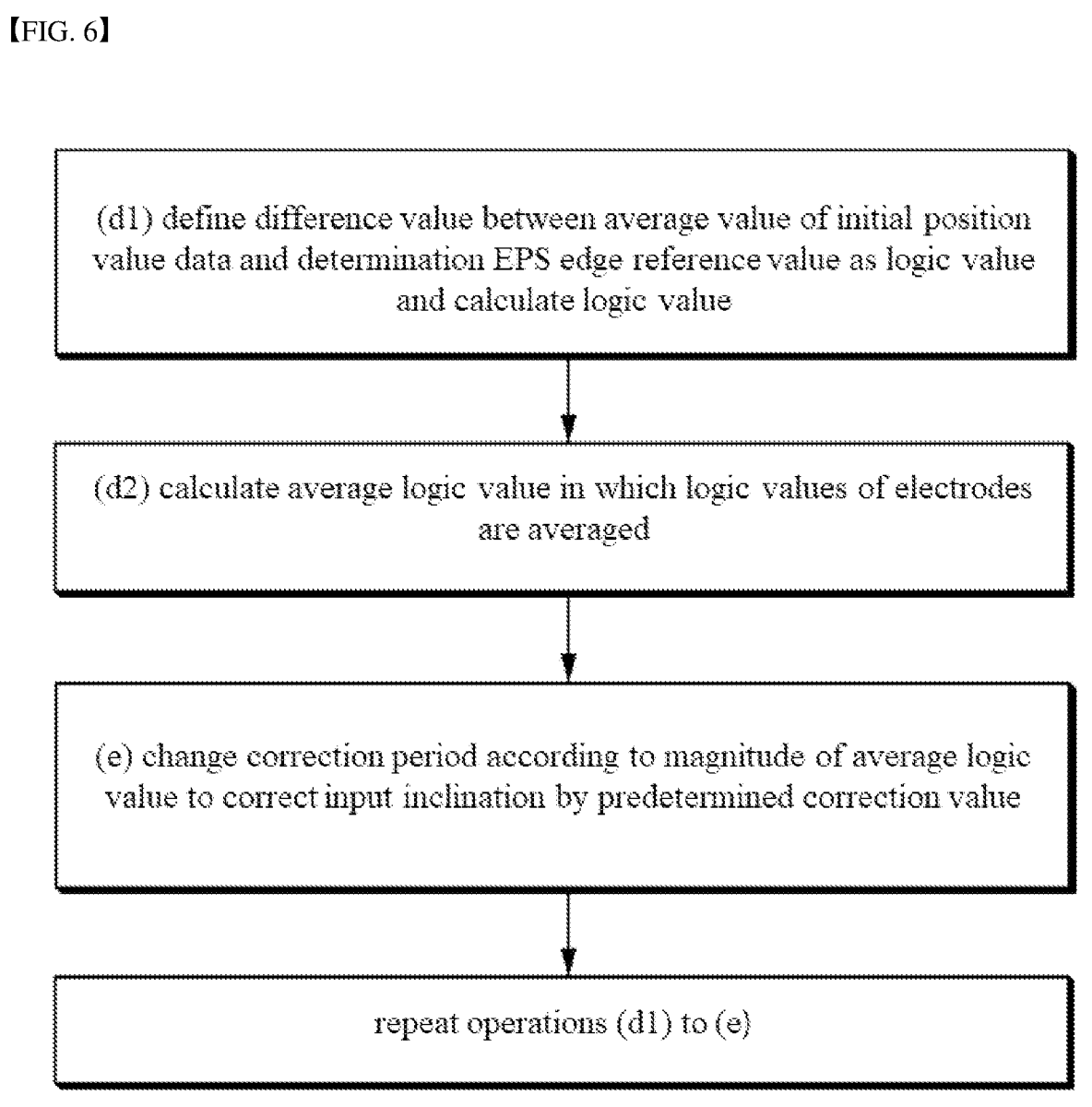

【FIG. 6】

(d1) define difference value between average value of initial position value data and determination EPS edge reference value as logic value and calculate logic value

↓

(d2) calculate average logic value in which logic values of electrodes are averaged

↓

(e) change correction period according to magnitude of average logic value to correct input inclination by predetermined correction value

↓ repeat operations (d1) to (e)

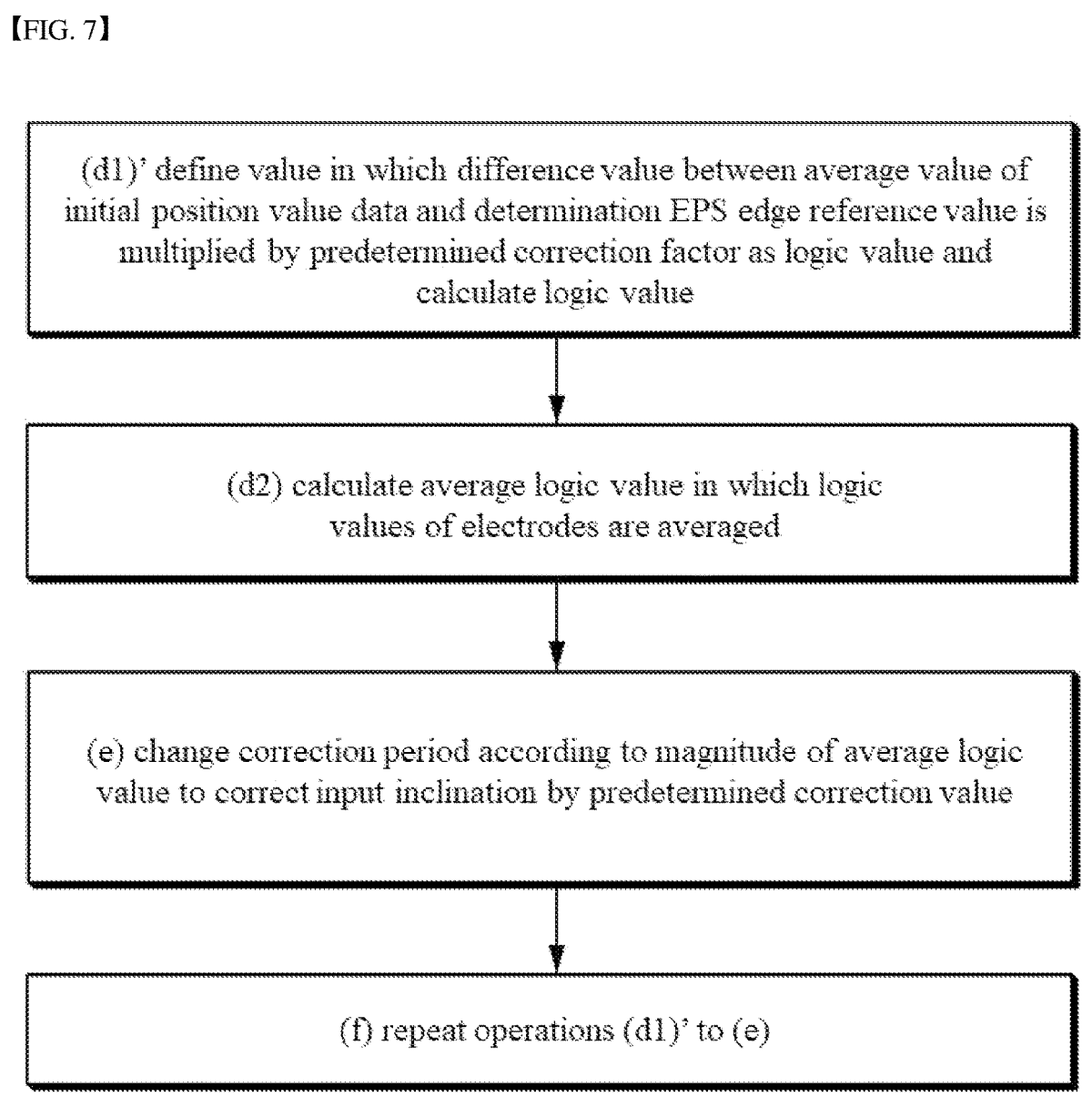

【FIG. 7】

(d1)' define value in which difference value between average value of initial position value data and determination EPS edge reference value is multiplied by predetermined correction factor as logic value and calculate logic value

↓

(d2) calculate average logic value in which logic values of electrodes are averaged

↓

(e) change correction period according to magnitude of average logic value to correct input inclination by predetermined correction value

↓

(f) repeat operations (d1)' to (e)

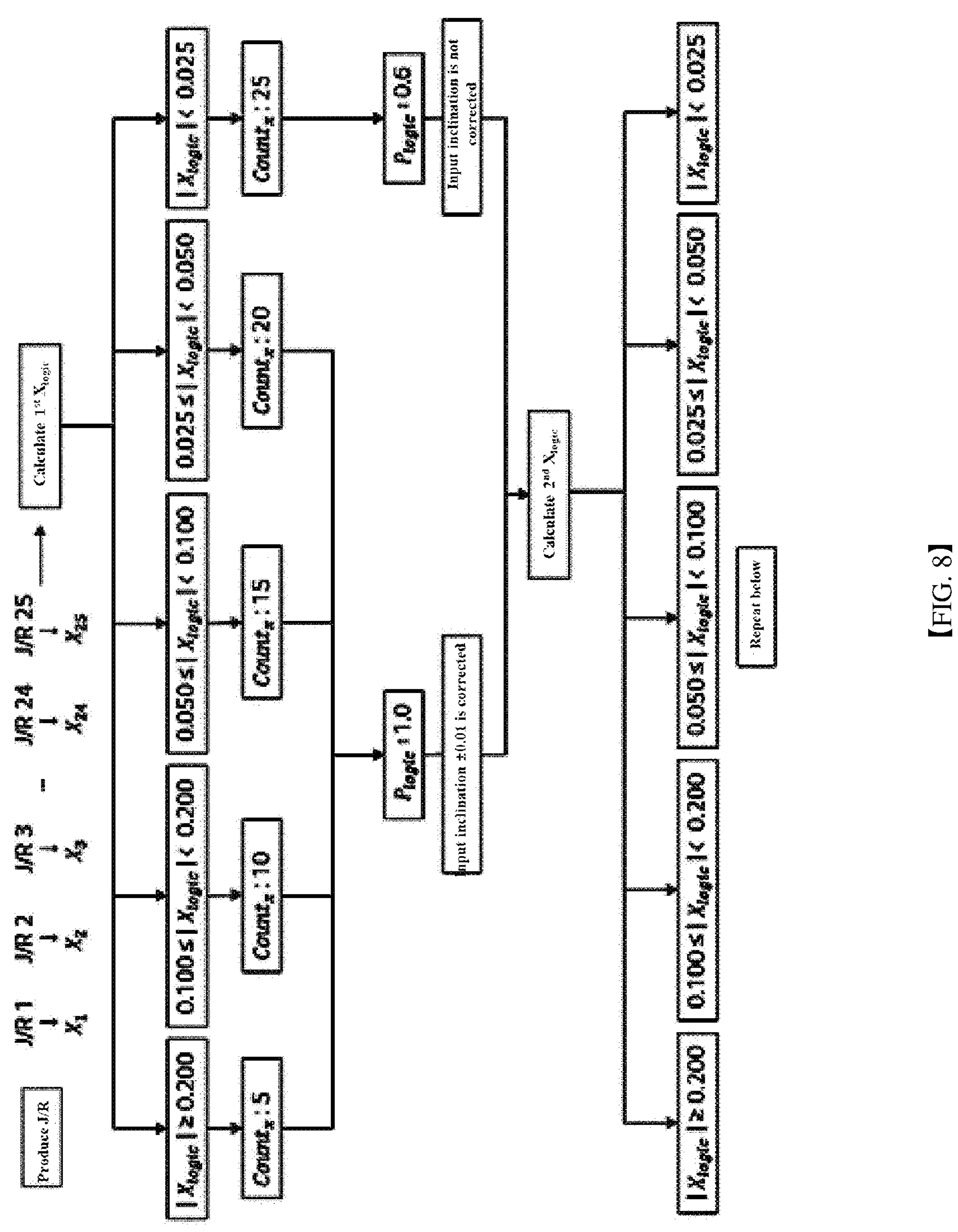
【FIG. 8】

【FIG. 9】
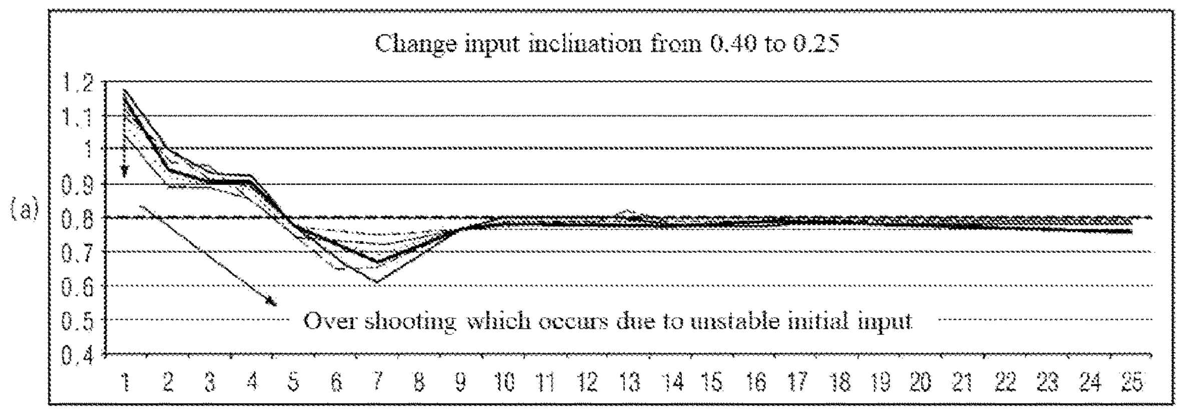
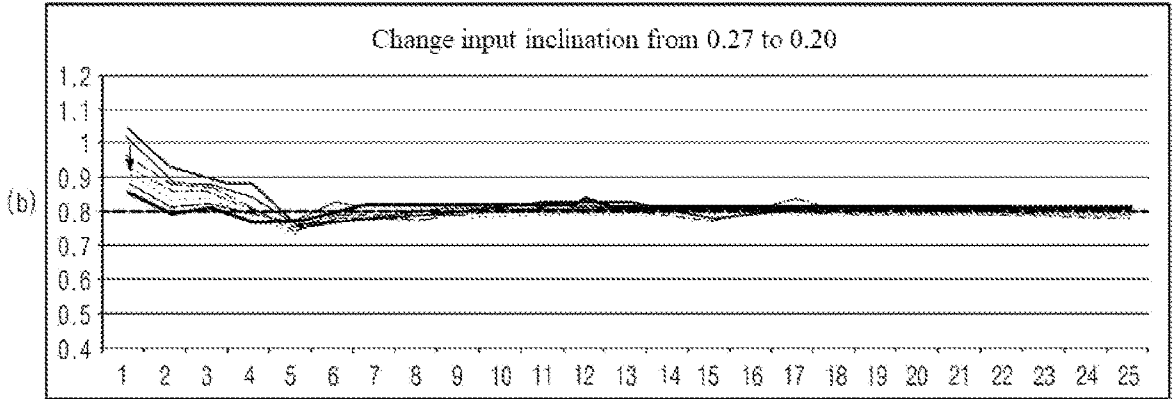
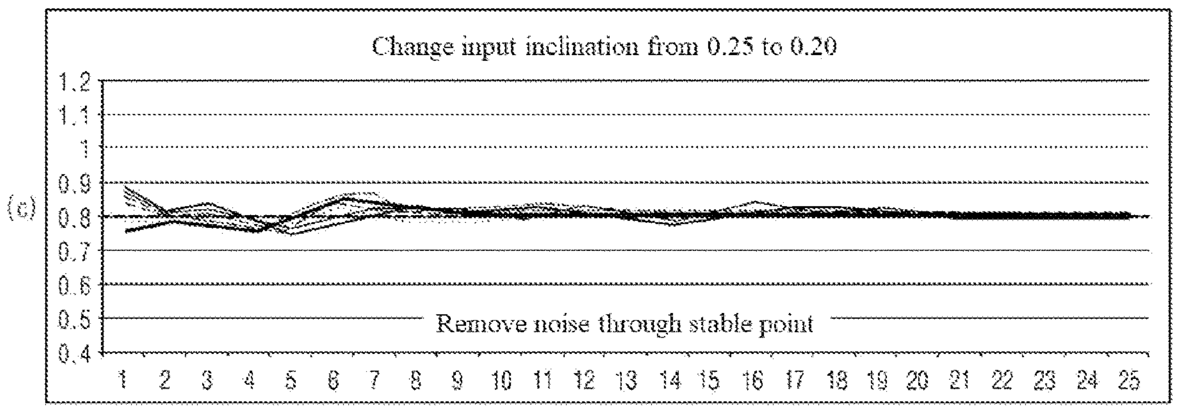

【FIG. 10】
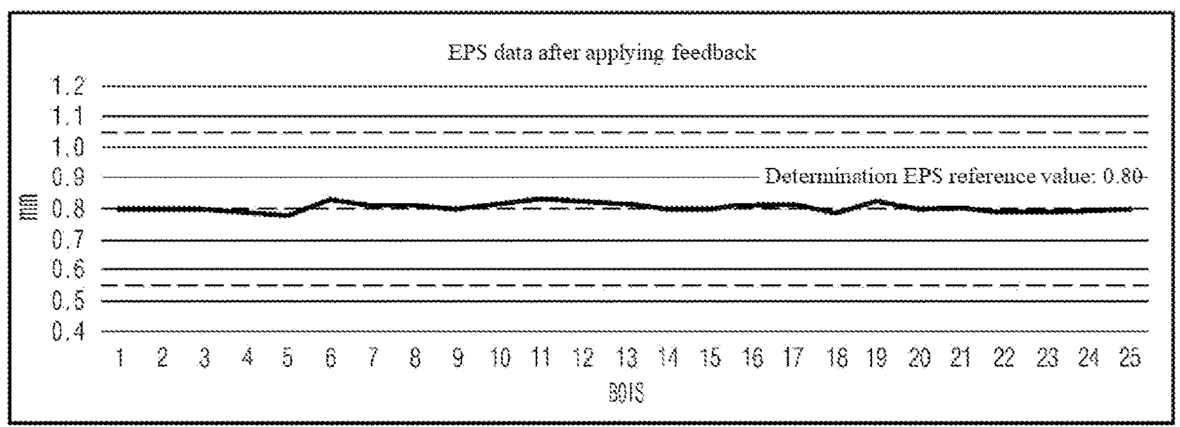

【FIG. 11】
(a)
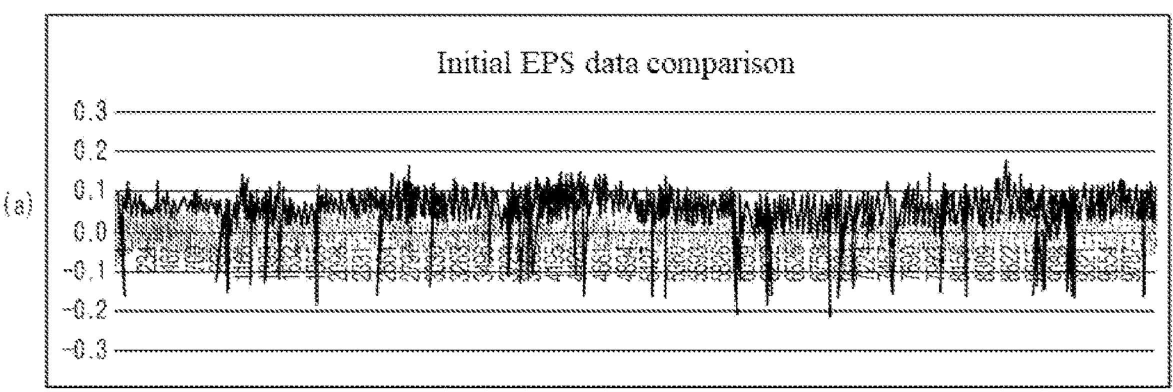
(b)
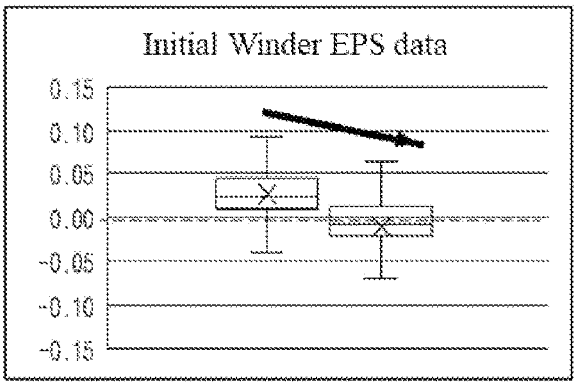

MEANDERING CORRECTION DEVICE FOR ELECTRODE AND MEANDERING CORRECTION METHOD FOR ELECTRODE

CROSS-REFERENCE TO RELATED APPLICATIONS

This application is a national phase entry under 35 U.S.C. § 371 of International Application No. PCT/KR2022/002242, filed on Feb. 15, 2022, which claims the benefit of priority based Korean Patent Application No. 10-2021-0026290, filed on Feb. 26, 2021, and the entire contents of the Korean patent application are incorporated herein by reference.

TECHNICAL FIELD

The present invention relates to a meandering correction device and a method of correcting meandering when an electrode is transferred. More specifically, the present invention relates to a meandering correction device and a method of correcting meandering when an electrode is transferred to a winding core to form a jelly roll electrode assembly by being wound around the winding core.

BACKGROUND ART

As technology development and demand for a mobile, an automobile, and an energy storage device increases, the demand for a battery as an energy source sharply increases. Many studies on a lithium secondary battery having a high energy density and a discharge voltage among these secondary batteries have been done, and the lithium secondary battery has been commercialized and widely used.

Specifically, a lithium secondary battery has an operating voltage of 3.6V or higher, which is three times higher than that of a nickel-cadmium battery or a nickel-hydrogen battery, which are widely used as a power source for a portable electronic device, and thus are rapidly expanding in terms of high energy density per unit weight.

Secondary batteries are classified according to a structure of an electrode assembly having a structure of a positive electrode, a negative electrode, and a separator interposed between the positive electrode and the negative electrode, and typically, long sheet-shaped positive and negative electrodes can be a jelly roll (wound type) electrode assembly having a structure wound with separators interposed therebetween, and a stack-type (stacked-type) electrode assembly in which a plurality of positive and negative electrodes cut in units of a predetermined size are sequentially stacked in a state of being interposed between the separators, a stack-folding electrode assembly having a structure in which unit cells such as a bi-cell or a full cell are wound in a state in which positive and negative electrodes of a predetermined unit are stacked with separators interposed therebetween, or the like.

Among the electrode assemblies, the jelly roll electrode assembly has an advantage of being easily manufactured and having a high energy density per weight. Specifically, the jelly roll-type electrode assembly having a high energy density can be built in a cylindrical metal can to form a cylindrical secondary battery, and this cylindrical battery is widely applied in a field where a high-capacity secondary battery is necessary, such as an electric vehicle.

In order to form the jelly roll electrode assembly, an electrode is input by an input clamp, is transferred toward the winding core, and is wound around the winding core to form the jelly roll electrode assembly. Specifically, a separator is also transferred with the electrodes such as a positive electrode and a negative electrode, and is wound together around the winding core together to form the jelly roll electrode assembly.

Ideally, the electrode correctly proceeds from being input until reaching the winding core to match a set edge reference value when being transferred to the winding core. However, in reality, meandering progress which proceeds outside the set edge reference value when the electrode is transferred inevitably occurs.

FIG. 1 is a schematic view illustrating a conventional electrode meandering correction device and correction method by a final edge position control (EPC) unit.

As shown in FIG. 1, an electrode 1 input by an input clamp 10 proceeds toward a winding core 60, and is wound around the winding core 60 through a final roller 50 to form a jelly roll electrode assembly together with a separator. At the time of winding by the winding core 60, an input side end portion of the electrode is cut by a cutter 20, and the cut end portion is also wound around the winding core 60 to form the jelly roll electrode assembly.

The conventional electrode meandering correction device corrects meandering of the electrode by providing a final EPC unit 30 in front of the final roller.

That is, the final EPC unit 30 measures an edge position of the electrode 1 by a determination edge position sensor (EPS) 32 installed at a predetermined position before the winding core 60 (Q: for example, a position of approximately 100 mm before the winding core). The edge position of this electrode 1 is indicated as a determination EPS edge position value. The determination EPS 32 may be a sensor which measures the electrode edge position in a non-contact manner, such as a light transmission and reception sensor or the like. When the determination EPS edge position value is different from a set determination EPS edge reference value A, a controller 40 moves the electrode in a width direction by an EPC roller 31 provided in a determination EPC unit to perform feedback control to match the edge position of the electrode and the determination EPS edge reference value A. In this case, the determination EPS edge reference value A is not 0, and is a set value determined in the determination EPS according to the roll-to-roll process conditions or the like of the electrode. Accordingly, when the process conditions are changed, the reference value may also be changed. For example, the determination EPS edge reference value may be 0.8 mm.

The EPC roller 31 may be, for example, a nip roller located in a vertical direction of the electrode. Electrode position correction by the EPC roller 31 may be performed at a predetermined position before the determination EPS 32 (P: for example, a position of approximately 125 mm before the winding core).

However, even when the meandering progress of the electrode is corrected by the final EPC unit 30, it was confirmed that a large number of meandering defects actually occurred during the progress of the electrode. Specifically, a meandering defect rate of the negative electrode was high. This is because a meandering defect unexpectedly occurs when the electrode is input even when the meandering is corrected by the final EPC unit 30.

FIG. 2 is a schematic diagram illustrating the influence of input instability when meandering is corrected by the final EPC unit.

That is, as shown in FIG. 2, since the input clamp 10 is inclined when the electrode is input, the input electrode is also inclined, as a result, the position of the electrode measured by the determination EPS 32 is also meandering and measured. The input clamp 10 is a clamp for inputting the electrode to the winding core, and includes, for example, an input clamp roller configured as a nip roller. In FIG. 2, a reference numeral 1*a* indicates an electrode that is biased and meandering due to the inclination of the input clamp 10 (specifically, inclination of the input clamp roller).

When this unexpected meandering defect occurs, the electrode assembly is not wound according to the design value, and thus finished battery performance can be adversely affected. It is determined that this unexpected meandering defect occurs because, for example, the electrode input by the input clamp 10 is unstable. That is, when the electrode 1 is input in a direction in which the meandering occurs when the electrode is initially input, even when the meandering is subsequently corrected by the final EPC unit 30 as shown in FIG. 1, since a meandering correction effect is limited, as described above, a meandering defect rate increases.

Accordingly, the development of technology capable of preventing the occurrence of an unexpected meandering defect by improving instability when the electrode is input is desired.

DISCLOSURE

Technical Problem

The present invention is directed to providing a meandering correction device at the time of electrode transfer in which instability while an electrode is input or installed is improved using determination edge position sensor (EPS) edge position value data of an electrode which changes over time when being feedback-controlled by an edge position control (EPC) unit before being wound around a winding core.

Further, the present invention is directed to providing a method of correcting meandering of an electrode in which the input inclination of an input clamp is controlled through feedback control which compares the determination EPS edge position value data and a determination EPS edge reference value.

Technical Solution

An electrode meandering correction device according to the present invention, which is a meandering correction device at the time of transferring an electrode wound around a winding core to form a jelly roll electrode assembly, includes: an input inclination adjustment mechanism of an input clamp configured to input the electrode to the winding core; an edge position control (EPC) unit provided with a determination edge position sensor (EPS) disposed before the winding core to measure an edge position of the electrode as a determination EPS edge position value, and an EPC roller configured to adjust the edge position of the electrode to match a determination EPS edge reference value; and a controller configured to control the EPC unit and the input inclination adjustment mechanism, wherein the controller feedback-controls the edge position of the electrode so that the determination EPS edge position value matches the determination EPS edge reference value, acquires determination EPS edge position value data when the determination EPS edge position value changes over time to converge to the determination EPS edge reference value by the feedback control, and selects data values changed by the influence of the input inclination of the input clamp from among the data and feedback-controls the input inclination adjustment mechanism to correct the input inclination by comparison of these data values and the determination EPS edge reference value.

Specifically, the EPC roller may be disposed in front of a determination EPS installation position at a predetermined interval.

As one embodiment, the controller may calculate a difference value between an average value of an initial data value among the determination EPS edge position value data and the determination EPS edge reference value to define the difference value as a logical value, may average the logic values of each electrode to acquire an average logic value when the electrodes are input a predetermined number of times, and may correct the input inclination for every predetermined number of inputs of the electrodes in response to the magnitude of the average logic value.

As a specific example, in the electrode meandering correction device, a correction period may be changed according to the magnitude of an absolute value of the average logic value, and the input inclination may be corrected by a predetermined correction value for each correction period.

As another embodiment, a value acquired by multiplying the difference value by a predetermined correction factor, which reflects a measurement error of the determination EPS due to an unexpected variable, may be defined as a logical value in the electrode meandering correction device.

Specifically, the correction factor may be determined differently according to the magnitude of the average logic value.

As another aspect of the present invention, a method of correcting electrode meandering at the time of transferring an electrode wound around a winding core to form a jelly roll electrode assembly, includes: measuring an edge position of an electrode when the electrode input by an input clamp reaches a determination EPS of an EPC unit disposed before a winding core by the determination EPS to measure a determination EPS edge position value; feedback-controlling the edge position of the electrode by the EPC unit so that the determination EPS edge position value matches a predetermined EPS edge reference value; acquiring determination EPS edge position value data when the determination EPS edge position value changes over time to converge to the determination EPS edge reference value by the feedback control of the EPC unit; and selecting data values changed by the influence of the input inclination from among the determination EPS edge position value data and correcting the input inclination through the feedback control which compares these data values and the determination EPS edge reference value.

As a specific method of correcting electrode meandering, the determination EPS edge position value data changed over time may be acquired by measuring a predetermined number of times at regular time intervals until converging to the determination EPS edge reference value, and the data values changed by the influence of the input inclination may be initial data values among the determination EPS edge position value data.

In the method of correcting electrode meandering, during the feedback control in comparison with the determination EPS edge reference value, a difference value between an average value of initial data values among the determination EPS edge position value data and the determination EPS edge reference value may be calculated to define the difference value as a logical value, and the input inclination may be corrected in response to the magnitude of the logic value.

As one example, in the method of correcting electrode meandering, the logic values of each electrode may be averaged to acquire an average logic value when the electrodes are input a predetermined number of times, and the input inclination may be corrected for every predetermined number of inputs of the electrodes in response to the magnitude of the average logic value.

Specifically, a correction period may be changed according to the magnitude of an absolute value of the average logic value to correct the input inclination.

As a specific example, the initial data values may be data values measured at first to fifth times by the determination EPS.

As one example, the input inclination may be corrected by a predetermined correction value for each correction period.

Specifically, a predetermined correction value may be subtracted from the input inclination when a sign of the average logic value is positive (+), and a predetermined correction may be added to the input inclination when a sign of the average logic value is negative (−).

As another example, in the method of correcting electrode meandering of the present invention, a value acquired by multiplying the difference value by a predetermined correction factor, which reflects a measurement error of the determination EPS due to an unexpected variable, may be defined as a logical value, and the input inclination may be corrected in response to the magnitude of the logic value.

Specifically, the correction factor may be determined differently according to the magnitude of the average logic value.

Advantageous Effects

According to the present invention, it is possible to improve meandering defects due to overshooting or noise when an electrode is input, which can be improved by stably inputting the electrode to a winding core.

Accordingly, since edge position sensor (EPS) data when the electrode is input can be stabilized and the deviation of initial EPS data can be reduced, there is an advantage in that quality of an electrode assembly can be stabilized by improving the meandering defects and the meandering deviation due to electrode input instability.

BRIEF DESCRIPTION OF THE DRAWINGS

FIG. 1 is a schematic view illustrating a conventional electrode meandering correction device and correction method by a final edge position control (EPC) unit.

FIG. 2 is a schematic diagram illustrating the influence of input instability when meandering is corrected by the final EPC unit.

FIG. 3 is a graph illustrating data of a determination edge position sensor (EPS) edge position value changed over time when an edge position of an electrode is feedback-controlled by the final EPC unit.

FIG. 4 is a schematic view illustrating an electrode meandering correction device according to the present invention.

FIG. 5 is a flowchart illustrating the order of a method of correcting electrode meandering according to the present invention.

FIG. 6 is a flowchart illustrating the order of feedback control for correcting input inclination according to one embodiment of the present invention.

FIG. 7 is a flowchart illustrating the order of feedback control for correcting input inclination according to another embodiment of the present invention.

FIG. 8 is a schematic view illustrating a feedback control process according to FIG. 7 of the present invention in relation to a logic value calculation process.

FIG. 9 is a graph illustrating a state in which the determination EPS edge position value over time is stabilized when the input inclination is corrected by a predetermined correction value by a method of correcting meandering of the present invention.

FIG. 10 is a graph related to the determination EPS edge position value after feedback control by the method of correcting meandering of the present invention.

FIG. 11 is a graph illustrating the deviation of initial determination EPS edge position values in the case of feedback control by the method of correcting meandering of the present invention.

BEST MODE

Hereinafter, the present invention will be described in detail. Prior to this, the terms and words used in the present specification and claims should not be construed as limited to ordinary or dictionary terms, and should be interpreted as meanings and concepts consistent with the invention or the proposed technical spirit based on the principle that the inventor may appropriately define the concept of a term to describe the invention thereof in the best way.

In this application, it should be understood that terms such as "include" or "have" are intended to indicate the presence of is a feature, number, step, operation, component, part, or a combination thereof described in the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" another portion but also the case where an additional portion is interposed therebetween. On the other hand, when a portion such as a layer, a film, an area, a plate, etc. is referred to as being "under" another portion, this includes not only the case where the portion is "directly under" another portion but also the case where an additional portion is interposed therebetween. In addition, to be disposed "on" in the present application may include the case disposed on a lower part as well as on an upper part.

Hereinafter, the present invention will be described in detail.

FIG. 3 is a graph illustrating data of a determination edge position sensor (EPS) edge position value changed over time when an edge position of an electrode is feedback-controlled by a final edge position control (EPC) unit.

In FIG. 1, a case in which an edge position of an electrode 1 in a determination EPS 32 of a final EPC unit 30 is measured, and meandering is corrected by adjusting the edge position of the electrode using an EPC roller 31 of the final EPC unit 30 so that the edge position of the electrode matches a determination EPS edge reference value has been described. However, even when the meandering is corrected by the final EPC unit 30, the edge position of the electrode does not directly reach the determination EPS edge reference value A, but proceeds to the determination EPS 32, and thus an edge position value of the electrode continuously measured at an EPS position (hereinafter, referred to as "a determination EPS edge position value") changes over time as shown in FIG. 3 to gradually converge to the determination EPS edge reference value.

FIG. 3 illustrates a case in which EPS data is measured a total of 50 times by a predetermined program (program name 'BOIS') which measures the edge position in the determination EPS 32 until converging to a determination EPS edge reference value A as measured EPS data. Since the BOIS program transmits only even-numbered data of the EPS data, as shown in FIG. 3, on the program, the determination EPS edge position value is measured a total of 25 times until converging to the determination EPS edge reference value A. In addition, an X-axis of FIG. 3 indicates the number of measurements or a measurement sequence number measured at regular time intervals until the determination EPS edge position value converges to the determination EPS edge reference value A, and a Y-axis indicates the determination EPS edge position values, which are electrode positions measured by the determination EPS, at each measurement sequence number.

As shown in FIG. 3, the determination EPS edge position values significantly fluctuate (decrease) in measurement sequence numbers 1 to 3, and then exhibit a slight undulating flow and gradually converge to the determination EPS edge reference value A (for example, 0.80 mm). As shown in FIG. 2, it is determined that the initial data values among determination EPS edge position value data greatly fluctuate due to overshooting when the electrode is input. That is, when the electrode is input, since an input clamp roller of the input clamp 10 is tilted and thus input inclination of the electrode is incorrectly set or the electrode 1 swings left and right during input and meandering occurs due to unexpected input, even when this is corrected by the final EPC unit 30, the initial data of the determination EPS edge position value measured at the EPS position is greatly changed as shown in FIG. 3. Accordingly, when the electrode 1 is input to a winding core 60 so that the initial data values do not significantly fluctuate, it is possible to reduce a meandering defect caused by overshooting or unexpected input instability as described above. Based on this point, the inventors select data values which fluctuate by the influence of the input inclination related to electrode input from the determination EPS position value data, and improve the meandering defect by correcting the inclination of the input clamp 10 through feedback control comparing these data values and the determination EPS edge reference value A.

FIG. 4 is a schematic view illustrating an electrode meandering correction device 100 according to the present invention.

In the present invention, the same components as those of the conventional meandering correction device in FIG. 1 are denoted by the same reference numerals.

The present invention is based on the feedback control by the final EPC unit 30, and thus includes an EPC unit 30 as in the related art. That is, the meandering correction device 100 of the present invention includes the EPC unit 30 provided with the determination EPS 32 which is disposed before the winding core 60 and determines the edge position of the electrode 1 to record the edge position as the determination EPS edge position value, and the EPC roller 31 which adjusts the edge position of the electrode so that the edge position of the electrode matches the determination EPS edge reference value A.

The present invention includes an input inclination adjustment mechanism 70 which adjusts an input inclination of the input clamp 10 in addition to the EPC unit 30. The input inclination adjustment mechanism 70 may adjust, for example, an input inclination of the input clamp, that is, an input inclination of the electrode input to the input clamp by adjusting the inclination of an input clamp roller or a roller shaft provided in the input clamp 10 in leftward and rightward directions. One end or both ends of the roller shaft may be connected to, for example, another shaft linearly moving and linked to the linear movement of the other shaft so that the roller shaft is inclined. The linearly moving shaft may be connected to a predetermined driving unit such as a motor or the like to move linearly. That is, the inclination of the roller shaft may be adjusted by connecting a converting mechanism (for example, a ball screw and a ball nut) that converts rotational movement to linear movement by a driving motor or the like and the linearly moving shaft, and moving the linearly moving shaft through driving of the motor. Alternatively, in a pneumatic cylinder in which a piston may linearly move from a cylinder, an air pressure is adopted to connect the piston and the roller shaft, and the inclination of the roller shaft may be adjusted by linear movement of the piston. Since such a linear movement mechanism is commonly known in the field of machinery, a detailed description thereof will be omitted. Importantly, when the inclination of the input clamp 10 is able to be adjusted by moving the input clamp roller or the roller shaft, a mechanical or electronic configuration of the inclination adjustment mechanism does not need to be specifically limited.

The present invention includes a controller 40 which controls the EPC unit 30 and the input inclination adjustment mechanism 70 of the input clamp. The controller 40 acquires the determination EPS edge position value from the EPS 32 of the EPC unit 30 and feedback-controls the edge position of the electrode 1 so that the determination EPS edge position value matches the determination EPS edge reference value A. In addition, the input inclination adjustment mechanism 70 is feedback-controlled so that the input inclination is corrected by comparing change values over time of the determination EPS edge position values acquired through the feedback process with the determination EPS edge reference value A.

The EPC roller 31 may be installed at a position (P: for example, 125 mm away from the winding core) in front of an installation position (Q: for example, 100 mm from the winding core) of the determination EPS 32 at a predetermined interval. When the position of the electrode 1 measured in the EPS 32 is different from the determination EPS edge reference value A, the controller 40 causes the EPC roller 31 to adjust the position of the electrode 1 in front of a predetermined interval of the determination EPS 32. Accordingly, when one electrode is continuously moved to the determination EPS 32, the position of this adjusted electrode 1 may be subsequently measured in the determination EPS 32.

Since the meandering correction device 100 of the present invention includes the input inclination adjustment mechanism 70 and the controller 40 which may correct the input inclination of the input clamp 10 by controlling the feedback of the EPC unit 30 and the input inclination adjustment mechanism 70, and thus the input stability of the electrode 1 input to the winding core 60 may be improved, it is possible to reduce the occurrence of an unexpected meandering defect.

In the present invention, in order to improve the input stability of the electrode 1, the determination EPS edge position value data changed by the influence of the input inclination and the determination EPS edge reference value A are compared to correct the input inclination according to the meandering correction device 100. According to the comparison, since the controller 40 feedback-controls the input inclination adjustment mechanism 70, and adjusts the input inclination as shown in FIG. 4 to correct an electrode input direction to B direction in FIG. 4, it is possible to reduce the occurrence of meandering due to an unexpected input defect.

The present invention further provides a method of correcting meandering at the time of transferring an electrode wound around the winding core 60 to form a jelly roll electrode assembly.

FIG. 5 is a flowchart illustrating the order of a method of correcting electrode meandering according to the present invention.

As shown in the drawings, first, in an operation (a), an edge position of the electrode when the electrode 1 input by the input clamp 10 reaches the determination EPS 32 of the EPC unit 30 disposed before the winding core is measured by the determination EPS 32, and thus the determination EPS edge position value is measured.

Then, in an operation (b), the edge position of the electrode is feedback-controlled by the EPC unit 30 so that the determination EPS edge position value matches the predetermined determination EPS edge reference value A.

Next, in an operation (c), by feedback control of the EPC unit 30, the determination EPS edge position value data when the determination EPS edge position value changes over time to converge to the determination EPS edge reference value A is acquired.

Next, in an operation (d), data values changed by the influence of the input inclination are selected from among the determination EPS edge position value data, and feedback control is performed to compare these data values and the determination EPS edge reference value A, and accordingly, the input inclination is corrected in an operation (e).

The determination EPS edge position value data which change over time may be acquired by measuring a predetermined number of times at regular time intervals until converging to the determination EPS edge reference value A. As shown in FIG. 3, the determination EPS edge position value data may be acquired by, for example, 50 measurements. As shown in FIG. 3, among the position value data, the data values changed by the influence of the input inclination are initially changed data values among the determination EPS edge position value data. For example, the initial data values may be data values measured 1 to 5 times by the determination EPS 32 when the determination EPS edge position value is measured 50 times until converging to the determination EPS edge reference value.

MODE OF THE INVENTION

In the method of correcting meandering of the present invention, since the input inclination is adjusted through the feedback control by comparing the initial data values with the determination EPS edge reference value A, a specific embodiment of the feedback control will be described below.

First Embodiment

FIG. 6 is a flowchart illustrating the order of the feedback control for correcting the input inclination of the input clamp according to one embodiment of the present invention.

First, in an operation (d1), the average value of the initial data values among the determination EPS edge position value data is compared with the determination EPS edge reference value A. Comparing the average value of the initial data values and the determination EPS edge reference value A rather than comparing a single value of the initial data values with the determination EPS edge reference value A may more effectively reflect the influence of the input instability. Accordingly, for example, a difference value between the average value of the (initial) determination EPS edge position values of measurement sequence numbers 1 to 5 times (1 to 3 times in the Bois program) in FIG. 3 and the determination EPS edge reference value A is calculated. This difference value is defined as a predetermined logic value ($X_{logic}$) for the feedback control, and is expressed as Equation 1 to be described below. A case in which the logic value is large means that instability when the electrode is input is large, and accordingly, the input inclination of the input clamp 10 may be corrected in response to the magnitude of the logic value.

$$X_{logic}=[\text{(an average value of determination } EPS \text{ edge position values No. 1 to No. 5)}-\text{determination } EPS \text{ edge reference value}] \quad \text{Equation 1}$$

In the embodiment, improving the reliability of meandering correction is promoted by using the average value of the logic values while a plurality of electrodes are input to correct the meandering of the electrode, which is going further than correcting the input inclination with a logic value while a single electrode is input. That is, in an operation (d2), when the electrodes are input a predetermined number of times, an average logic value (average $X_{logic}$: see Equation 2 to be described below) in which the logic values of each electrode are averaged is calculated.

$$\text{average } X_{logic}=X_1+X_2+\ldots+Xn-1+Xn/n \text{ when electrodes are input } n \text{ times} \quad \text{Equation 2}$$

The average logic value is an average of each logic value when the plurality of electrodes are input, and thus better indicates the instability when the electrodes are input. Accordingly, when the input inclination is corrected for every predetermined number of inputs of the electrodes in response to the magnitude of the average logic value, the instability when the electrode is input may be more effectively resolved.

Further, it is more preferable to perform correction by changing a correction period according to the magnitude of the average logic value. A case in which the average logic value when the electrodes are input a predetermined number of times is large means that the instability when the electrodes are input is large. Accordingly, when the average logic value is large, the correction period may be reduced to perform the correction quickly, and the correction period may be elongated when the average logic value is small. In FIG. 4, the determination EPS edge position values exhibit negative (−) values when inclined to a left side, and exhibit positive (+) values when inclined to a right side. Accordingly, a sign of the average logical value may also be expressed as negative or positive, and correction may be performed by changing the correction period according to the magnitude of an absolute value of the average logical value.

An example of a case in which the correction is performed by changing the correction period according to the magnitude of the absolute value of the average logic value is as follows.

<average $X_{logic}$ when electrodes are input 5 times> average $X_{logic}=X_1+X_2+X_3+X_4+X_5/5$ $|\text{average } X_{logic}|\geq 0.200 \rightarrow$ input inclination correction every 5 electrode inputs <average $X_{logic}$ when electrodes are input 10 times> average $X_{logic}=X_1+X_2+\ldots+X_9+X_{10}/10$ $0.100 < |\text{average } X_{logic}| < 0.200 \rightarrow$ input inclination correction every 10 electrode inputs <average $X_{logic}$ when electrodes are input 15 times> average $X_{logic} = X_1 + X_2 + \ldots + X_{14} + X_{15}/15$ $0.050 \leq |\text{average } X_{logic}| < 0.100 \rightarrow$ input inclination correction every 15 electrode inputs <average $X_{logic}$ when electrodes are input 20 times> average $X_{logic} = X_1 + X_2 + \ldots + X_{19} + X_{20}/20$ $0.025 \leq |\text{average } X_{logic}| < 0.050 \rightarrow$ input inclination correction every 20 electrode inputs <average $X_{logic}$ when electrodes are input 25 times> average $X_{logic} = X_1 + X_2 + \ldots + X_{24} + X_{25}/25$ $|\text{average } X_{logic}| < 0.025 \rightarrow$ input inclination correction is not performed When the average logic value is calculated in the operation (d2), the input inclination may be corrected by a predetermined correction value by changing the correction period according to the magnitude of the average logic value (operation (e)). This correction value may be given as a default value which is a numerical unit that may be corrected according to the magnitude of the average logic value within a limit capable of adjusting the input inclination. For example, the input inclination may be corrected by a correction value of 0.01. A case in which the correction value is large means that the magnitude of the inclination corrected by one correction is large, and a case in which the correction value is small means that the magnitude of the inclination corrected by one correction is small. When the correction value is small, the magnitude of roller inclination corrected once is small, but the input inclination may be more precisely adjusted.

Meanwhile, since the average logic value has a sign, the input inclination correction value is applied to be opposite the sign. For example, since the input inclination is corrected by subtracting a predetermined correction value (for example, 0.01) when the sign of the average logic value is positive, and the input inclination is corrected by adding a predetermined correction value (for example, 0.01) when the sign of the average logic value is negative, consequently, the magnitude of the average logic value may be reduced.

Hereinafter, as the operations (d1) to (e) are repeated in an operation (f), the feedback correction in which the average logic values are sequentially reduced with respect to the plurality of electrodes input by the input clamp 10 is performed. When this feedback correction is repeated and ultimately the magnitude of the average logic value is smaller than a set predetermined value, since the electrode input instability is completely resolved and thus the input inclination enters a stabilization section, the input inclination does not need to be additionally corrected. That is, when the absolute value of the average $X_{logic}$ is smaller than 0.025, since the input inclination enters a stabilization section, the input inclination does not need to be corrected. When the input inclination is corrected in this section, the input instability rather increases.

Second Embodiment

FIG. 7 is a flowchart illustrating the order of feedback control for correcting input inclination according to another embodiment of the present invention The embodiment is different from the first embodiment in the definition of a logic value $X_{logic}$.

In the embodiment, in order to acquire a logical value, a value acquired by multiplying the logical value (a difference value between the average value of the initial data values and the determination EPS edge reference value) of the first embodiment by a predetermined correction factor, which reflects a measurement error of the determination EPS due to an unexpected variable, is defined as a logical value. The electrode is continuously transferred from electrode production and winding lines to be transferred to and wound around the winding core to form a jelly roll electrode assembly. In this process, hunting or overshooting of unknown causes may occur. Alternatively, a sensor such as an EPS or the like may be contaminated, or, in extreme cases, the electrode may be separated from the winding core or the like and thus an error in the determination EPS measurement value may occur. When the measurement error of the determination EPS due to this unexpected variable is not considered, the measurement error inevitably generated during feedback control may not be reflected, and thus the influence of input instability may not be accurately evaluated. Accordingly, in the second embodiment, a value acquired by multiplying a predetermined correction factor, which reflects the measurement error of the determination EPS due to this unexpected variable, is used as a logical value. For example, when the correction factor is 1, a case of a common line operation in which an unexpected variable may occur may be shown. On the other hand, when the correction factor is smaller than 1, for example, 0.6, a stable operation situation in which an unexpected variable does not occur is reflected. When the logic value or the average logic value is smaller than a predetermined value even in the stable operation situation, it may be determined that the input stability has entered a stable section, and in this case, the input inclination no longer needs to be corrected.

From the above, when the correction factor is $P_{logic}$, in an operation (d1)', the logic value $X_{logic}$ of the embodiment may be defined as Equation 3 to be described below.

$$X_{logic} = [(\text{average value of determination } EPS \text{ edge position values No. 1 to No. 5}) - \text{determination } EPS \text{ edge reference value}] \times P_{logic} \quad \text{Equation 3}$$

Then, in the operation (d2), when the electrodes are input a predetermined number of times, an average logic value (average $X_{logic}$: see Equation 4 to be described below) in which the logic values of each electrode are averaged is calculated.

$$\text{an average } X_{logic} \text{ when electrodes are input } n \text{ times} = X_1 + X_2 + \ldots + X_{n\_1} + X_n/n] \times P_{logic} \quad \text{Equation 4}$$

Further, it is more preferable to perform correction by changing a correction period according to the magnitude of the average logic value. An example in which correction may be performed for every predetermined number of electrode inputs by changing the correction period according to the magnitude of an absolute value of the average logical value is as follows.

<average $X_{logic}$ when electrodes are input 5 times> average $X_{logic} = \{X_1 + X_2 + X_3 + X_4 + X_5/5\} \times P_{logic}$ $P_{logic} = 1.0$ $|\text{average } X_{logic}| \geq 0.200 \rightarrow$ input inclination correction every 5 electrode inputs <average $X_{logic}$ when electrodes are input 10 times> average $X_{logic} = \{X_1 + X_2 + \ldots + X_9 + X_{10}/10\} \times P_{logic}$ $P_{logic} = 1.0$ $0.100 \leq |\text{average } X_{logic}| < 0.200 \rightarrow$ input inclination correction every 10 electrode inputs <average $X_{logic}$ when electrodes are input 15 times> average $X_{logic} = \{X_1 + X_2 + \ldots + X_{14} + X_{15}/15\} \times P_{logic}$ $P_{logic} = 1.0$ $0.050 \leq |\text{average } X_{logic}| < 0.100 \rightarrow$ input inclination correction every 15 electrode inputs <average $X_{logic}$ when electrodes are input 20 times> average $X_{logic}=\{=X_1+X_2+ \ldots +X_{19}+X_{20}/20\}\times P_{logic}$ $P_{logic}=1.0$ $0.025\leq|\text{average } X_{logic}|<0.050\rightarrow$input inclination correction every 20 electrode inputs <average $X_{logic}$ when electrodes are input 25 times> average $X_{logic}=\{X_1+X_2+ \ldots +X_{24}+X_{25}/25\}\times P_{logic}$ $P_{logic}=0.6$

|average $X_{logic}$ 1<0.025→input inclination correction is not performed

When the average logic value is calculated in the operation (d2), the input inclination may be corrected by a predetermined correction value by changing the correction period according to the magnitude of the average logic value (operation (e)). For example, the input inclination may be corrected by a correction value of 0.01. Since the input inclination is corrected by subtracting a predetermined correction value (for example, 0.01) when the sign of the average logic value is positive, and the input inclination is corrected by adding a predetermined correction value (for example, 0.01) when the sign of the average logic value is negative, consequently, the magnitude of the average logic value may be reduced.

Hereinafter, since the operations (d1)' to (e) are repeated in an operation (f), the feedback correction in which the average logic values are sequentially reduced with respect to the plurality of electrodes input by the input clamp 10 is performed. When this feedback correction is repeated and ultimately the magnitude of the average logic value is smaller than a set predetermined value, since the electrode input instability is completely resolved and thus the input inclination enters a stabilization section, the input inclination does not need to be additionally corrected. That is, when the absolute value of the average $X_{logic}$ is smaller than 0.025, since the input inclination enters the stabilization section, the input inclination does not need to be corrected. When the input inclination is corrected in this section, the input instability rather increases. When a correction factor due to the unexpected variable is not considered like the first embodiment, there is a case in which the input inclination is mechanically corrected according to the average logic value even when the stable operation progresses due to a small number of unexpected variables. In this case, the input instability rather increases due to the input inclination correction. Accordingly, as described above, when the absolute value of the average logic value is smaller than 0.025 by multiplying the average logic value when electrodes are input 25 times by a correction factor of 0.6, since the stabilization period has already been entered, a decision to not make any more corrections is required. In this case, when the average logic value is calculated by multiplying the correction factor of 1, the correction of the input inclination may be meaninglessly repeated. Accordingly, the present embodiment is significant in that the input stability may be reliably improved by setting a consistent standard (a correction factor of 0.6) for the stabilization section without unexpected variables and establishing a final goal of the feedback control.

FIG. 8 is a schematic view more clearly illustrating a feedback control process of the second embodiment according to FIG. 7 of the present invention in relation to a logic value calculation operation.

As shown in FIG. 8, for example, average logic values are obtained from initial EPS data of 25 jellyroll (J/R) electrode assembly manufacturing electrodes (J/R1, J/R2, . . . J/R24, J/R25). Further, these average logic values are multiplied by a predetermined correction factor (for example, 1.0 or 0.6).

The correction period is varied (for example, correction once every 5 inputs, 10 inputs, inputs, and 20 inputs) according to the magnitude of the absolute value of the average logic values reflecting this correction factor to adjust the input inclination by adding or subtracting a predetermined correction value (0.01).

When the magnitude of the average logic value multiplied by the correction factor by the primary logic value calculation is smaller than 0.025 (when the correction factor of 0.6 is multiplied), the purpose of feedback control is achieved and there is no need to correct the input inclination. Otherwise, the above-described process is repeated to calculate a secondary logic value.

FIG. 9 is a graph illustrating a state in which the determination EPS edge position value over time is stabilized when the inclination of the input clamp 10 (input inclination) is corrected by a predetermined correction value by a method of correcting meandering of the present invention.

FIG. 9A illustrates a change of the EPS data over time (the number of measurement times) when the input inclination is adjusted by a correction value of 0.01 and corrected from an initial input inclination of 0.40 to a final input inclination of 0.25 (a total of 15 correction times). As shown in the drawings, as the correction is repeated, it can be seen that the degree of deviation of the initial EPS data from the determination EPS edge reference value decreases.

FIG. 9B illustrates a case in which the input inclination is adjusted by a correction value of 0.01 from an initial input inclination of 0.27 to a final input inclination of 0.20 (a total of 7 correction times), and FIG. 9C illustrates a case in which the input inclination is adjusted by a correction value of 0.01 from an initial input inclination of 0.25 to a final input inclination of 0.20 (a total of 5 correction times). When the input inclination is changed to 0.20 as shown in FIG. 9C, it can be seen that the initial EPS data converges close to the determination EPS edge reference value, and thus noise is removed by stable input.

FIG. 10 is a graph related to the determination EPS edge position value after feedback control is completed by the method of correcting meandering of the present invention. This is the same as a graph in a case in which the input inclination of FIG. 9 is feedback-controlled to 0.20. In FIG. 10, since the initial EPS data approaches the determination EPS edge reference value almost similar to the intermediate-period and late-period data, it can be seen that the input stability is greatly improved.

FIG. 11 is a graph illustrating a deviation of initial determination EPS edge position values in the case of feedback control by the method of correcting meandering of the present invention, initial EPS data in the case of no feedback control is shown in red, and initial EPS data in the case of feedback control is shown in blue. As shown in FIG. 11A, it can be seen that the deviation of initial EPS data is significantly reduced in the case in which the feedback control is performed for thousands of input electrodes compared to the case in which feedback control is not performed. FIG. 11B illustrates this deviation in a simplified form, and it can be seen that the deviation of the initial EPS data approaches 0.00 when a large number of electrodes are feedback-controlled, and thus the input stability is greatly improved, and the deviation of the electrode position according to the input is also greatly reduced.

In the above, the present invention has been described in more detail with reference to the drawings, examples, and the like. However, since the configuration described in the drawings, embodiments, or the like described in the present specification is only one embodiment of the present invention and does not represent all the technical spirit of the present invention, it should be understood that there may be various equivalents and modifications at the time of filing the present application.

REFERENCE NUMERALS

1: electrode
1*a*: meandering proceeding electrode
10: input clamp
20: cutter
A: determination EPS edge reference value
30: EPC unit
31: EPC roller
32: determination EPS
40: controller
50: final roller
60: winding core
70: input inclination adjustment mechanism of input clamp
100: meandering correction device

The invention claimed is:

1. An electrode meandering correction device comprising:

an input inclination adjustment mechanism of an input clamp configured to input the electrode to a winding core, wherein the input inclination adjustment mechanism is configured to rotationally adjust the inclination angle of the input clamp;

an edge position control (EPC) unit provided with a determination edge position sensor (EPS) disposed before the winding core to measure an edge position of the electrode as a determination EPS edge position value, and an EPC roller configured to adjust the edge position of the electrode to match a determination EPS edge reference value; and a controller configured to control the EPC unit and the input inclination adjustment mechanism, wherein the controller feedback-controls the edge position of the electrode so that the determination EPS edge position value matches the determination EPS edge reference value, acquires determination EPS edge position value data from the determination EPS when the determination EPS edge position value changes over time to converge to the determination EPS edge reference value by the feedback control, and selects data values changed by influence of the input inclination of the input clamp from among the determination EPS edge position value data and feedback-controls the input inclination adjustment mechanism to correct the input inclination by comparison of these data values and the determination EPS edge reference value.

2. The electrode meandering correction device of claim 1, wherein the EPC roller is disposed in front of a determination EPS installation position at a predetermined interval.

3. The electrode meandering correction device of claim 1, wherein the controller calculates a difference value between an average value of an initial data value among the determination EPS edge position value data and the determination EPS edge reference value to define the difference value as a logical value, the controller averages the logic values of each electrode to acquire an average logic value when the electrodes are input a predetermined number of times, and the controller corrects the input inclination for every predetermined number of inputs of the electrodes in response to a magnitude of the average logic value.

4. The electrode meandering correction device of claim 3, wherein:

a correction period is changed according to a magnitude of an absolute value of the average logic value; and the input inclination is corrected by a predetermined correction value for each correction period.

5. The electrode meandering correction device of claim 3, wherein a value acquired by multiplying the difference value by a predetermined correction factor, which reflects a measurement error of the determination EPS due to an unexpected variable, is defined as a logical value.

6. The electrode meandering correction device of claim 5, wherein the correction factor is determined differently according to the magnitude of the average logic value.

7. A method of correcting electrode meandering at the time of transferring an electrode wound around a winding core to form a jelly roll electrode assembly, the method comprising:

measuring an edge position of an electrode when the electrode input by an input clamp reaches a determination edge position sensor (EPS) of an edge position control (EPC) unit disposed before the winding core by the determination EPS to measure a determination EPS edge position value;

feedback-controlling the edge position of the electrode by the EPC unit so that the determination EPS edge position value matches a predetermined EPS edge reference value;

acquiring determination EPS edge position value data from the determination EPS when the determination EPS edge position value changes over time to converge to the determination EPS edge reference value by the feedback control of the EPC unit; and selecting data values changed by influence of the input inclination of the input clamp from among the determination EPS edge position value data and rotationally adjusting the inclination angle of the input clamp through the feedback control which compares these data values and the determination EPS edge reference value.

8. The method of claim 7, wherein:

the determination EPS edge position value data changed over time is acquired by measuring a predetermined number of times at regular time intervals until converging to the determination EPS edge reference value; and the data values changed by the influence of the input inclination are initial data values among the determination EPS edge position value data.

9. The method of claim 8, wherein, during the feedback control in comparison with the determination EPS edge reference value, a difference value between an average value of initial data values among the determination EPS edge position value data and the determination EPS edge reference value is calculated to define the difference value as a logical value, and the input inclination is corrected in response to a magnitude of the logic value.

10. The method of claim 9, wherein:

the logic values of each electrode are averaged to acquire an average logic value when the electrodes are input a predetermined number of times; and the input inclination is corrected for every predetermined number of inputs of the electrodes in response to a magnitude of the average logic value.

11. The method of claim 10, wherein a correction period is changed according to a magnitude of an absolute value of the average logic value to correct the input inclination.

12. The method of claim 11, wherein the input inclination is corrected by a predetermined correction value for each correction period.

13. The method of claim 12, wherein a predetermined correction value is subtracted from the input inclination when a sign of the average logic value is positive (+), and a predetermined correction value is added to the input inclination when a sign of the average logic value is negative (−).

14. The method of claim 9, wherein the initial data values are data values measured at first to fifth times by the determination EPS.

15. The method of claim 9, wherein:

a value acquired by multiplying the difference value by a predetermined correction factor, which reflects a measurement error of the determination EPS due to an unexpected variable, is defined as the logical value; and the input inclination is corrected in response to the magnitude of the logic value.

16. The method of claim 15, wherein:

the logic values of each electrode are averaged to acquire an average logic value when the electrodes are input a predetermined number of times; and the input inclination is corrected for every predetermined number of inputs of the electrodes in response to a magnitude of the average logic value.

17. The method of claim 15, wherein a correction period is changed according to a magnitude of an absolute value of the average logic value to correct the input inclination.

18. The method of claim 17, wherein the input inclination is corrected by a predetermined correction value for each correction period.

19. The method of claim 16, wherein the correction factor is determined differently according to the magnitude of the average logic value.

* * * * *